June 30, 1970  K. WAGNER ET AL  3,517,595
FLASH UNIT FOR USE WITH FLASHCUBES OR THE LIKE
Filed Sept. 25, 1967  3 Sheets-Sheet 1
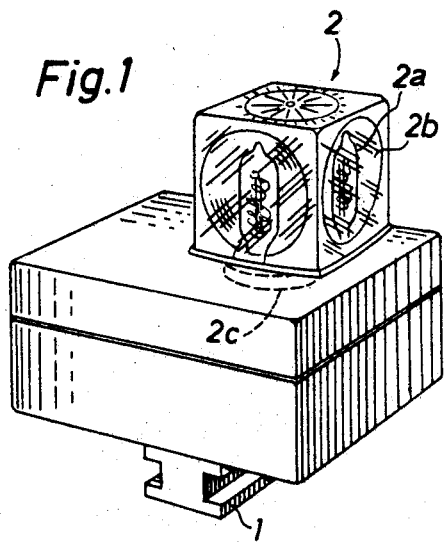
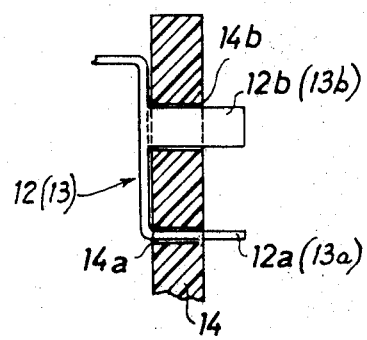
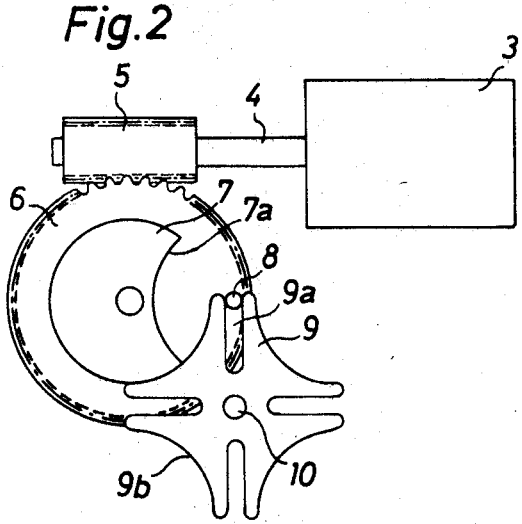
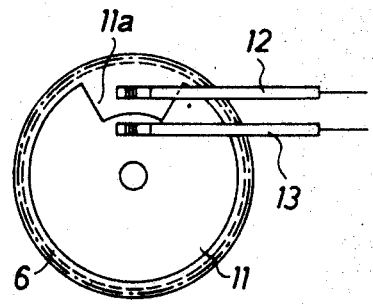
INVENTORS:
KARL WAGNER
KLAUS NICOLAY
ENGELBERT FLIESSER
FRANZ LANDBRECHT
JOHANN PUTSCHER
BY Michael S. Striker
attorney

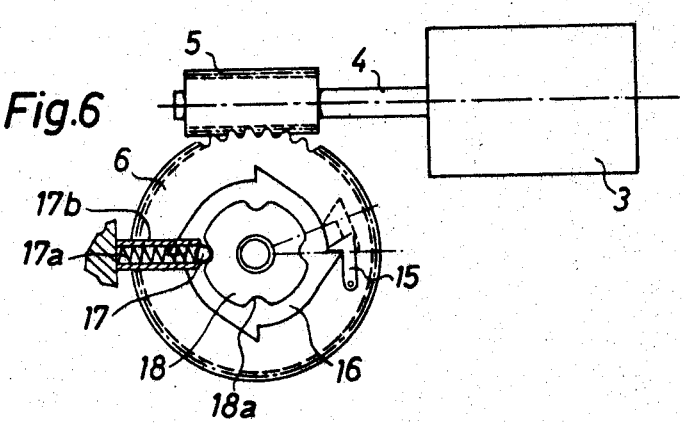
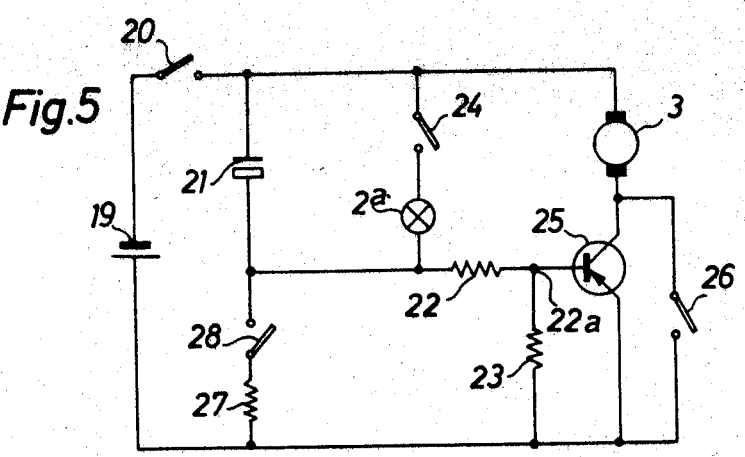

United States Patent Office 3,517,595
Patented June 30, 1970

3,517,595
FLASH UNIT FOR USE WITH FLASHCUBES OR THE LIKE
Karl Wagner, Ottobrunn, Klaus Nicolay and Engelbert Fliesser, Munich, Franz Landbrecht, Unterhaching, near Munich, and Johann Putscher, Munich, Germany, assignors to Agfa-Gevaert Aktiengesellschaft, Leverkusen, Germany
Filed Sept. 25, 1967, Ser. No. 670,130
Claims priority, application Germany, Sept. 29, 1966,
A 53,619
Int. Cl. G03b 9/70
U.S. Cl. 95—11.5                           24 Claims

ABSTRACT OF THE DISCLOSURE

A flash unit for use with Flashcubes wherein the socket which receives the plug of a Flashcube is indexible by a motor or by the reciprocable armature of an electromagnet to place successive flash bulbs into firing position. A capacitor is charged during indexing of the socket and is ready to discharge and to cause firing of a flash bulb in response to closing of the synchronizing switch. The motor or electromagnet is energized when the charge of the capacitor is within a predetermined range, always when a flash bulb has been fired so that the socket is indexed upon firing. The motor or electromagnet is de-energized automatically not later than at the time when a fresh flash bulb moves into firing position. The flash circuit includes a transistor element which is activated by the capacitor discharge to subsequently energize the motor or electromagnet for indexing the flash unit.

BACKGROUND OF THE INVENTION

The present invention relates to flash units for use in or on photographic cameras. More particularly, the invention relates to flash units employing "Flashcubes" or analogous multiple flash bulb holders which must be indexed to place successive flash bulbs into firing position. Still more particularly, the invention relates to an improved indexing mechanism for multiple flash bulb holders and to operating means for such mechanism.

It is already known to provide a flash unit for use with multiple flash bulb holders with an indexing mechanism which comprises an alternating current motor. When a current flows through a flash bulb which is in firing position, a coil in series with the flash bulb neutralizes a rotation-producing component of the magnetic field of the motor. Such motors are disclosed, for example, in U.S. Pat. No. 2,258,575 to MacKay. The just described conventional indexing mechanism consumes too much energy so that it is not suited for use in flash units which are provided with a battery or a like relatively small energy source. Furthermore, it is difficult to obtain alternating current in a small portable flash unit of the type which is attached to or built into a still camera.

SUMMARY OF THE INVENTION

It is an object of our invention to provide a portable flash unit with an indexing mechanism which can move the support for a multiple flash bulb holder with consumption of small amounts of electrical energy, which cannot move the holder when a flash bulb is being fired, and which can be used in portable flash units of the type to be attached to or built into a photographic camera.

Another object of the invention is to provide a flash unit wherein the indexing mechanism for the multiple flash bulb holder operates in dependency on the condition of a capacitor which supplies current for firing of a flash bulb.

A further object of the invention is to provide a novel operating system for the indexing mechanism.

An additional object of the invention is to provide an indexing mechanism which can be operated with direct current.

A concomitant object of the invention is to provide an indexing mechanism which invariably arrests the multiple flash bulb holder in a position in which a fresh bulb is in an optimum position for illumination of the subject or scene.

A further object of the invention is to provide an indexing mechanism for the multiple flash bulb holder of a flash unit which utilizes a direct current motor or an electromagnet.

An additional object of our invention is to provide a flash unit wherein the indexing mechanism occupies little room and which is particularly suited for use in connection with multiple flash bulb holders of the type commonly known as "Flashcubes."

Briefly stated, the invention is embodied in a flash unit which comprises a socket or a like support which can be coupled with a multiple flash bulb holder and is indexible to place successive flash bulbs into a firing position, and an electric circuit including a capacitor, a battery or an analogous relatively small replaceable or rechargeable source of electrical energy, charging means for charging the capacitor, discharging means preferably including a synchronizing switch for discharging the capacitor in response to opening of the shutter in a camera to which the flash unit is connected or in which the flash unit is incorporated to thereby fire that flash bulb which is in firing position, indexing means for indexing the support and preferably including a direct current motor having a rotary output member or an electromagnet having a reciprocable armature, and operating means including a transistor for operating the indexing means when the charge of the capacitor is within a predetermined range. The operating means may constitute an amplifier circuit which energizes the motor or electromagnet, either for a certain period of time to effect indexing of the support through 90 degrees or in rapid succession until the displacement of the support suffices to place a fresh flash bulb into firing position.

The novel features which are considered as characteristic of the invention are set forth in particular in the appended claims. The improved flash unit itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a portable flash unit which embodies one form of our invention;

FIG. 2 is a somewhat schematic view of an indexing mechanism including a direct current motor installed in the flash unit of FIG. 1;

FIG. 3 illustrates the rear side of a rotary member in the indexing mechanism of FIG. 2;

FIG. 4 is a sectional view of an insulating carrier for the fixed contacts of the structure shown in FIG. 3;

FIG. 5 illustrates the electric circuit of the flash unit shown in FIG. 1;

FIG. 6 illustrates a modified indexing mechanism which also includes a direct current motor;

DESCRIPTION OF THE PREFERRED EMBODIMENTS

Figure 7:
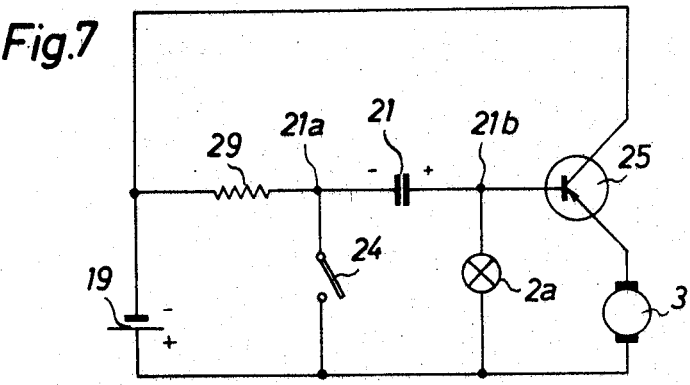
FIG. 7 illustrates another electric circuit.

FIG. 1 illustrates a self-contained flash unit which employs multiple flash bulb holders 2 of the type known as "Flashcubes" and whose casing is provided with a foot 1 insertable into the accessory shoe of a photographic camera. The multiple flash bulb holder 2 has four flash bulbs 2a each located in front of a reflector 2b. The indexing mechanism of the flash unit turns the holder 2 through 90 degrees or a multiple of 90 degrees upon completion of an exposure with flash so that a fresh flash bulb 2a is held in a firing or operative position in which it faces the subject prior to making of the next exposure. The indexible support or socket of the flash unit is shown at 2c.

The foot 1 is preferably provided with a customary central contact to connect the synchronizing switch of the camera into the circuit of the flash unit when the foot is inserted into the accessory shoe on the camera body. However, it is equally possible to employ a customary flash unit cord which is plugged into the outlet of the camera when the flash unit is attached to the camera body. It is equally clear that the flash unit of FIG. 1 can be built into the body of a camera; in such a camera, the indexing mechanism is installed in the camera body and can receive current from one or more batteries which supply energy to the exposure control of the camera or from a separate source of electrical energy.

FIG. 2 illustrates a first embodiment of the improved indexing mechanism. A direct current motor 3 is the prime mover of this mechanism and has an output shaft 4 which carries a worm 5 meshing with a rotary member or worm wheel 6. The shaft of the worm wheel 6 carries a disk-shaped blocking element 7 of a Geneva transmission which further includes a star wheel 9 mounted on a shaft 10 which can rotate a multiple flash bulb holder 2 when the latter is properly inserted into the indexible socket 2c of the flash unit. The star wheel 9 has four radially extending slots 9a each adapted to receive a motion transmitting pin 8 on the worm wheel 6. The blocking element 7 has a cutout 7a bounded by a concave surface and the star wheel 9 has four peripheral cutouts 9b each bounded by a concave surface whose radius of curvature equals the radius of the blocking element 7. The axis of the pin 8 is located in the central symmetry plane of the cutout 7a. When the worm wheel 6 is idle, the blocking element 7 extends into one of the cutouts 9b to prevent rotation of the star wheel 9.

When the worm wheel 6 receives motion from the worm 5 and turns in a clockwise direction, the pin 8 enters the adjoining slot 9a and turns the star wheel 9, shaft 10 and the multiple flash bulb holder 2 through 90 degrees. The socket 2c for the plug of the holder 2 may but need not be directly connected with the shaft 10. It is equally possible to employ a fixed shaft 10 which rotatably supports the star wheel 9 and to provide a coupling between the star wheel and the socket 2c.

The rear side of the worm wheel 6 carries a disk-shaped movable contact 11 of conductive material which can cooperate with two fixed elastic contacts 12, 13 (see FIG. 3) to form therewith a holding switch which opens automatically when the fixed contact 12 enters a notch 11a in the marginal portion of the movable contact 11. The notch 11a extends along an arc of about 90 degrees. The contact 13 is in permanent current-conducting engagement with the movable contact 11. The notch 11a can be replaced by an insulator which is applied against or is recessed into the exposed surface of the movable contact 11.

As shown in FIG. 4, the contacts 12, 13 are respectively provided with bent-over portions or lugs 12a, 12b and 13a, 13b which extend through separate slits 14a, 14b provided in a plate-like carrier 14 of insulating material. This carrier supports a printed circuit which forms part of the electric circuit in the flash unit embodying the indexing mechanism of FIGS. 2 and 3. Once the projecting portions of lugs 12a, 12b and 13a, 13b are bent over, the carrier 14 is connected with certain other components of the electric circuit and the connections are soldered by dipping so that the contacts 12, 13 are properly fixed to the carrier 14.

FIG. 5 shows an electric circuit which embodies the structure shown in FIGS. 2 to 4. The direct current motor is shown at 3 and the holding switch including the contacts 11–13 is shown at 26. A battery 19 is connected in series with a master switch 20 which can be closed in response to insertion of the foot 1 (FIG. 1) into the accessory shoe of a photographic camera. It is also possible to install the master switch 20 in the casing of the flash unit shown in FIG. 1 in such a way that the master switch closes in response to insertion of the multiple flash bulb holder 2 into the socket 2c. Furthermore, the master switch 20 can be installed in such a way that it must be closed by hand prior to making one or more exposures with flash.

The charging circuit for a capacitor 21 in the electric circuit of FIG. 5 comprises two series-connected resistors 22, 23 the latter of which is connected with one pole of the battery 19. A fresh flash bulb 2a which is ready to be fired is in parallel with the capacitor 21 and in series with a synchronizing switch 24. The common point 22a of the resistors 22, 23 is connected with the base of a transistor 25. The winding of the motor 3 is connected between the other (negative) pole of the battery 19 and the collector of the transistor 25. The emitter of the transistor 25 is connected with the positive pole of the battery 19. The holding switch 26 (including the contacts 11–13) is in parallel with the transistor 25 which latter forms part of operating means for the indexing mechanism 3–10.

A further resistor 27 is in series with the capacitor 21 but in parallel with the resistors 22, 23. This resistor 27 can be connected in series with a control switch 28 which closes simultaneously with the holding switch 26 and is preferably mechanically connected thereto.

The operation is as follows:

Prior to an exposure with flash, the elements of the electric circuit assume the positions shown in FIG. 5. When the plug of a multiple flash bulb holder 2 is properly inserted into the socket 2c of the flash unit shown in FIG. 1, a fresh flash bulb 2a faces the subject and the foot 1 closes the master switch 20 so that the capacitor 21 is charged. The operator then actuates the shutter release of the camera to close the synchronizing switch 24 with a delay which depends on the type of shutter whereby the capacitor 21 discharges, at least in part, and fires the flash bulb 2a.

When the capacitor 21 discharges, the potential at the base of the transistor 25 approximates that at the positive pole of the battery 19. When the synchronizing switch 24 is closed and a current flows through the flash bulb 2a, the potential at the base drops below that at the emitter of the transistor 25 so that the latter conducts current and completes the circuit of the direct current motor 3 which begins to drive the output shaft 4 with a small delay following firing of the flash bulb 2a. The output shaft 4 drives the worm 5 and worm wheel 6. After the worm wheel 6 completes a certain angular movement, the pin 8 enters the adjoining slot 9a and turns the star wheel 9 through 90 degrees. In response to rotation of the star wheel 9, the movable contact 11 engages the fixed contact 12 to close the holding switch 26 (i.e., the cutout 11a moves beyond the contact 12) whereby the holding switch 26 provides a path for the flow of electric current which bypasses the transistor 25. Consequently, the motor 3 continues to run independently of the charge of the capacitor 21 and comes to a halt when the fixed contact 12 reenters the cutout 11a of the movable contact 11. In the meantime, the capacitor 21 is charged again through the resistors 22, 23 so that it blocks the transistor 25 until after renewed closing of the synchronizing switch 24. Also, the shaft 10 of the star wheel 9 has turned the multiple flash bulb holder 2 through 90 degrees so that a fresh flash bulb 2a faces the subject prior to the next exposure with flash.

An important advantage of the indexing mechanism shown in FIGS. 2 to 4 is that the worm wheel 6 effects an indexing movement of the holder 2 while it turns through 90 degrees so that the remaining 270 degrees of a complete revolution of the worm wheel can be used for starting of the motor 3 during firing of a flash bulb 2a and for running out of the motor after the holding switch 26 opens. The motor 3 can rotate at a high speed because there is ample time for its acceleration and deceleration. This is important because the voltage of battery 19 depends to a large extent on its age and the deceleration of motor 3 is a function of such voltage. Furthermore, the rate of speed at which the capacitor 21 is charged through the resistors 22, 23 does not affect the duration of interval during which the motor 3 is running, i.e., such rate of charging does not affect the position in which the wheel 6 is held when the motor comes to a halt. All that counts is to insure that the holding switch 26 closes prior to complete charging of the capacitor 21.

The function of the control switch 28 is to connect the third resistor 27 into the charging circuit of the capacitor 21 when the motor 3 is running due to closing of the holding switch 26. The resistor 27 is then connected in parallel with the resistors 22, 23. However, and as a rule, no problems are encountered in selecting the resistance of at least one of the resistors 22, 23 in such a way that the charging of capacitor 21 requires more time than needed to close the holding switch 26 on rotation of the worm wheel 6 and that the capacitor 21 is fully charged during the remainder of the available interval, namely, while the holding switch 26 is closed. If such prerequisites are met for all conditions of the battery 19, the control switch 28 and additional resistor 27 can be dispensed with.

The circuit of FIG. 5 can also employ an alternating current motor.

FIG. 6 illustrates a second indexing mechanism for a multiple flash bulb holder. The output shaft 4 of a direct current motor 3 drives a worm 5 which meshes with a worm wheel 6. The latter carries at least one pawl 15 which is biased by a spring (not shown) so that its pallet bears against a ratchet wheel 16. This ratchet wheel is rotatable with reference to but is coaxial with the worm wheel 6 and is coupled with a socket 2c (not shown) for a multiple flash bulb holder 2 and carries a disk 18 forming part of a detent device which further includes a ball 17 biased by a spring 17a and located at the open end of a tubular receptacle 17b fixed to the casing of the flash unit or to the camera body. A fresh flash bulb faces the subject when the pawl 15 turns the ratchet wheel 16 through 90 degrees so that the ball 17 snaps into one of four shallow equidistant notches 18a in the periphery of the disk 18. The notches 18a of the disk 18 are bounded by rounded surfaces of such configuration that the disk moves ahead of the pawl 15 and worm wheel 6 when it approaches the next position of rest, preferably about 15 degrees ahead of the position when the ball 17 snaps into the deepmost zone of a notch 18a. In other words, when the worm wheel 6 rotates in a clockwise direction, the pawl 15 engages the nearest tooth of the ratchet wheel 16 and rotates the latter in a clockwise direction through approximately 75 degrees. The ball 17 then takes over and propels the ratchet wheel 16 and disk 18 through about 15 degrees so that the previously engaged tooth of the ratchet wheel 16 moves ahead of and away from the pallet of the pawl 15. The assembly including the ratchet wheel 16 and pawl 15 replaces the Geneva transmission of FIG. 2.

The rear side of the worm wheel 6 again carries a movable disk-shaped contact (not shown), which cooperates with two fixed contacts substantially in the same way as shown in FIG. 3. The sole difference is that the disk-shaped contact on the worm wheel 6 of FIG. 6 comprises four equidistant notches each of which extends along an arc of about 25 degrees.

A circuit which embodies the indexing mechanism shown in FIG. 6 is similar to the circuit of FIG. 5. When the transistor 25 conducts current and causes the motor 3 of the indexing mechanism shown in FIG. 6 to run, the pawl 15 engages the ratchet wheel 16 with a short delay following rotation of the ratchet wheel 16 for reasons which were explained above in connection with functioning of the detent device 17, 18. The position of the pawl 15 when the worm wheel 6 is idle is shown in FIG. 6 by phantom lines. When the pawl 15 turns the detent disk 18 (and hence the multiple flash bulb holder 2) through approximately 75 degrees, the ball 17 snaps into the nearest notch 18a of the disk 18. This takes place after the holding switch 26 (FIG. 6) opens, i.e., when the circuit of the motor 3 is open, so that the pawl 15 comes to a halt in a position in which its pallet is slightly spaced from the nearest tooth of the ratchet wheel 16. The configuration of the ratchet wheel 16 is such that it allows for manual rotation (in a clockwise direction) of an improperly inserted multiple flash bulb holder 2 with one, two or three spent flash bulbs 2a.

The motor 3 of FIG. 2 or 6 will rotate the multiple flash bulb holder again and again in response to successive closings of the synchronizing switch 24.

FIG. 7 shows a modified electric circuit wherein the parts corresponding to those illustrated in FIG. 5 are denoted by similar reference numerals. The charging circuit for the capacitor 21 comprises a resistor 29 in series with a fresh flash bulb 2a and connected to the negative pole of a battery 19. The positive pole of the battery 19 is connected with the flash bulb 2a. A tap 21a between the capacitor 21 and resistor 29 is connected with one contact of the synchronizing switch 24 which is in parallel with the flash bulb 2a. A second tap 21b between the capacitor 21 and the flash bulb 2a is connected with the base of an operating transistor 25. The motor 3 is connected between the negative pole of the battery 19 and the collector of the transistor 25. The emitter of this transistor is connected with the positive pole of the battery 19. The transistor 25 can be by-passed by a holding switch (not shown) corresponding to the holding switch 26 of FIG. 5. The holding switch can be omitted if the motor 3 is of the type which turns stepwise in response to a succession of current impulses each of which causes it to rotate the multiple flash bulb holder through 90 degrees.

Figure 8:
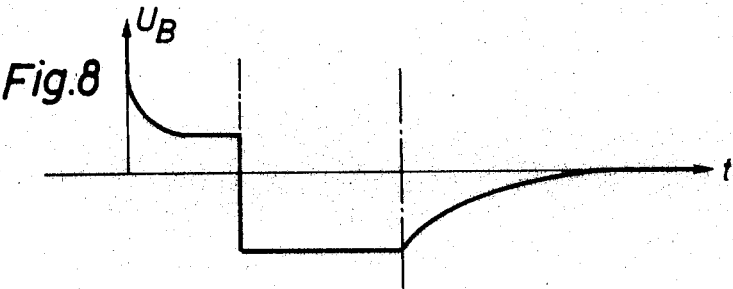
FIG. 8 illustrates changes in the capacity of a capacitor in the circuit of FIG. 7.

FIG. 8 shows a curve indicating the changes in potential at the base of the transistor 25 as a function of time. During a first interval which begins with a full capacitor potential at the base, the synchronizing switch 24 is closed. The capacitor 21 discharges through the flash bulb 2a so that its potential decreases continuously until the firing of bulb 2a comes to an end. The base potential then remains substantially constant and positive due to remaining charge of the capacitor 21, as long as the synchronizing switch 24 remains closed. The base potential is also positive with reference to the emitter of the transistor 25 so that the latter remains blocked. When the synchronizing switch 24 opens, the potential at one side of the capacitor 21 becomes lower through the resistor 29 in contrast to the condition prevailing when the synchronizing switch 24 is closed, i.e., when this switch connects the tap 21a with the positive pole of the battery 19. The base potential of the transistor 25 drops to such an extent that the transistor conducts current and enables the motor 3 to index the multiple flash bulb holder and to place a fresh bulb 2a into position for firing. Since the indexing begins on opening of the synchronizing switch 24, the shutter of the camera is already closed, i.e., the holder 2 cannot be indexed while a flash bulb 2a is being fired. The capacitor 21 as then charged through a fresh flash bulb 2a, i.e., such fresh flash bulb (in firing position) is then connected in the charging circuit for the capacitor 21. If the circuit comprises a glow lamp to indicate the potential of the capacitor 21, the lamp will also indicate the conductivity of the flash bulb 2a.

Figure 9:
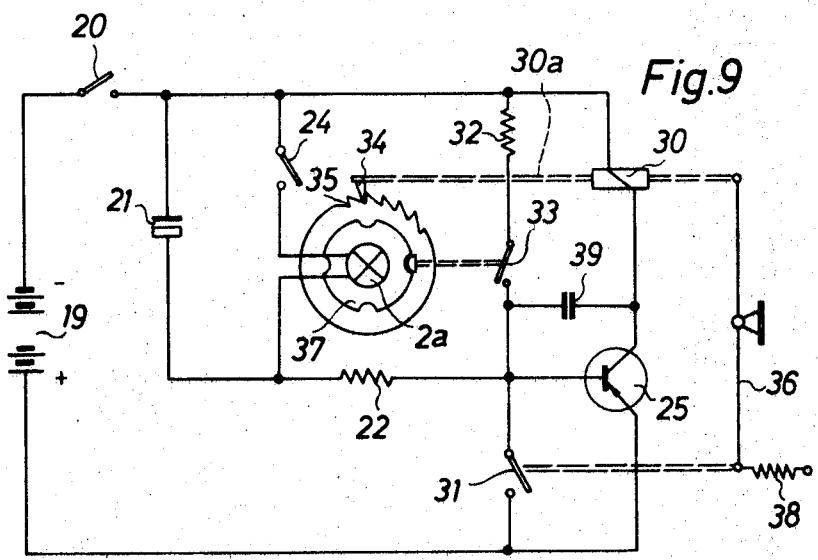
FIG. 9 illustrates a still further electric circuit wherein the indexing mechanism comprises an electromagnet.

Referring finally to FIG. 9, there is shown a further electric circuit whose indexing mechanism includes a modified prime mover constituted by an electromagnet 30 and serving to index a multiple flash bulb holder with flash bulbs 2a in dependency on the charge of a capacitor 21. The basic difference between this circuit and the previously described circuits is that the armature 30a of the electromagnet 30 reciprocates and carries a pawl 34 which cooperates with a ratchet wheel 35. The armature 30a performs a series of working strokes before the ratchet wheel 35 turns the multiple flash bulb holder through full 90 degrees. An advantage of such indexing mechanism is that it can employ a relatively small electromagnet whose armature performs short working and return strokes.

An interrupter switch 31 is connected between the collector and base of an operating transistor 25 and is closed by a motion transmitting arm 36 when the armature 30a completes a working stroke. A return spring 38 biases the interrupter switch 31 to open position and also causes the armature 30a to perform a return stroke in response to deenergization of the electromagnet 30. The base of the transistor 25 is connected with a resistor 32 through a holding switch 33. The resistor 32 is connected with the negative pole of the battery 19 in response to closing of the master switch 20. A capacitor 39 is connected between the base and emitter of the transistor 25 to determine the time required for energization of the electromagnet 30.

The operation is as follows:

When the capacitor 21 is charged, the potential at the base of the transistor 25 changes through the resistor 22 whereby the transistor conducts current to effect energization of the electromagnet 30. The latter moves the armature 30a in a direction to the right whereby the pawl 34 turns the ratchet wheel 35 by an increment (in a clockwise direct) and the holding switch 33 closes automatically in response to turning of a disk-shaped cam or trip 37 which is connected with the multiple flash bulb holder or with the socket 2c for the plug of the multiple flash bulb holder. The motion transmitting arm 36 closes the interrupter switch 31 against the opposition of the return spring 38 so that the transistor 25 is blocked. The electromagnet 30 is deenergized, the spring 38 contracts, and the arm 36 causes the armature 30a to perform a return stroke while the interrupter switch 31 opens. The interval during which the electromagnet 30 remains deenergized depends on the capacitor 39, i.e., the transistor 25 begins to conduct current when the capacitor 39 is charged. The electromagnet 30 is energized again and its armature 30a causes the pawl 34 to turn the ratchet wheel 35, cam 37 and multiple flash bulb holder until the arm 36 closes the interrupter switch 31 again to deenergize the electromagnet. The same procedure is repeated again until the cam 37 allows the holding switch 33 to open; this takes place when the multiple flash bulb holder has been turned through 90 degrees to place a fresh flash bulb 2a into a position for firing. The four notches of the cam 37 are equidistant from each other.

The charging of capacitor 21 through the resistor 22 and interrupter switch 31 must be completed prior to turning of the multiple flash bulb holder through full 90 degrees.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

1. A flash unit, comprising an indexible support for multiple flash bulb holders of the type having a plurality of flash bulbs movable with the support sequentially into a firing position; and an electric circuit including a capacitor, a source of electric energy, charging means for charging the capacitor, discharging means for discharging the capacitor to thereby fire that flash bulb which is located in firing position, indexing means for said support, and operating means including amplifier means for operating said indexing means when the charge of said capacitor is within a predetermined range so that said support is indexed as a function of the condition of said capacitor.

2. A flash unit as defined in claim 1, wherein that flash bulb which is located in said firing position forms part of said charging means.

3. A flash unit as defined in claim 2, wherein said discharging means comprises a synchronizing switch in series with said capacitor and with that flash bulb which is located in firing position.

4. A flash unit as defined in claim 1, wherein said indexing means comprises a motor for moving said support in stepwise fashion.

5. A flash unit as defined in claim 1, wherein said charging means comprises resistor means and wherein the time required for charging said capacitor is less than the interval required for indexing of said support.

6. A flash unit as defined in claim 5, wherein said resistor means comprises a plurality of resistors and wherein said time is determined by the resistance of at least one of said resistors, the capacitor of said capacitor and the charge of said energy source.

7. A flash unit as defined in claim 1, wherein said indexing means comprises a direct current motor having a rotary output member and transmission means connecting said output member with said support.

8. A flash unit as defined in claim 7, wherein said transmission means comprises a Geneva transmission.

9. A flash unit as defined in claim 7, wherein said transmission means comprises a ratchet-and-pawl assembly.

10. A flash unit as defined in claim 9, further comprising detent means for yieldably holding said support when a flash bulb assumes said firing position.

11. A flash unit as defined in claim 9, wherein said transmission means further comprises a rotary member receiving motion from said motor and carrying the pawl of said assembly, the ratchet of said assembly being turnable by said pawl and being operatively connected with said support.

12. A flash unit as defined in claim 11, wherein said pawl is biased against said ratchet and wherein said ratchet is coaxial with and turnable relative to said rotary member.

13. A flash unit as defined in claim 1, wherein said indexing means comprises an electromagnet having a reciprocable armature arranged to perform a series of working strokes for placing a fresh flash bulb into said firing position.

14. A flash unit as defined in claim 13, wherein said indexing means further comprises a ratchet wheel connected with said support and a pawl connected with said armature and cooperating with said ratchet wheel to rotate said support stepwise when said armature performs working strokes.

15. A flash unit, comprising an indexible support for multiple flash bulb holders of the type having a plurality of flash bulbs movable with the support sequentially into a firing position; and an electric circuit including a capacitor, a source of electrical energy, charging means for charging the capacitor, discharging means for discharging the capacitor to thereby fire that flash bulb which is located in firing position, indexing means for said support, and operating means for operating said indexing means when the charge of said capacitor is within a predetermined range, said operating means comprising a transistor having a base connected with said capacitor and said indexing means comprising a winding connected with the emitter-collector stage of said transistor.

16. A flash unit as defined in claim 15, wherein said winding is connected with one pole of said source and said one pole is further connected with the base of said transistor through that flash bulb which is in firing position, the emitter of said transistor being connected with the other pole of said source.

17. A flash unit, comprising an indexible support for multiple flash bulb holders of the type having a plurality of flash bulbs movable with the support sequentially into a firing position; and an electric circuit including a capacitor, a source of electrical energy, charging means for charging the capacitor, discharging means for discharging the capacitor to thereby fire that flash bulb which is located in firing position, indexing means for said support, and operating means for operating said indexing means when the charge of said capacitor is within a predetermined range, said charging means comprising a control switch which closes temporarily in response to indexing of said support by said operating means.

18. A flash unit, comprising an indexible support for multiple flash bulbholders of the type having a plurality of flash bulbs movable with the support sequentially into a firing position; and an electric circuit including a capacitor, a source of electrical energy, charging means for charging the capacitor, discharging means for discharging the capacitor to thereby fire that flash bulb which is located in firing position, indexing means for said support, said indexing means comprising a direct current motor having a rotary output member and transmission means connecting said output member with said support, operating means for operating said indexing means when the charge of said capacitor is within a predetermined range, said operating means comprising a transistor which controls energization of said motor, and holding switch means actuated by said motor to provide a bypass path for current flow through said motor in response to indexing of said support.

19. A flash unit as defined in claim 18, wherein said transmission means comprises means for closing said holding switch means in response to starting of said motor and for opening said switch means prior to complete halt of said motor.

20. A flash unit, comprising an indexible support for multiple flash bulb holders of the type having a plurality of flash bulbs movable with the support sequentially into a firing position; and an electric circuit including a capacitor, a source of electrical energy, charging means for charging the capacitor, said charging means comprising a pair of resistors in series, discharging means for discharging the capacitor to thereby fire that flash bulb which is located in firing position, indexing means for said support, and operating means for operating said indexing means when the charge of said capacitor is within a predetermined range, said operating means comprising a transistor having an emitter-collector stage connected with one of said resistors and a base connected with the other resistor.

21. A flash unit, comprising an indexible support for multiple flash bulb holders of the type having a plurality of flash bulbs movable with the support sequentially into a firing position; and an electric circuit including a capacitor, a source of electrical energy, charging means for charging the capacitor, discharging means for discharging the capacitor to thereby fire that flash bulb which is located in firing position, indexing means for said support, said indexing means comprising an electromagnet having a reciprocable armature arranged to perform a series of working strokes for placing a fresh flash bulb into said firing position, and operating means for operating said indexing means when the charge of said capacitor is within a predetermined range, said operating means comprising a transistor for controlling the energization of said electromagnet, a second capacitor connected between the base and collector of said transistor, an interrupter switch between the base and emitter of said transistor, and means for closing said interrupter switch in response to completion of a working stroke by said armature.

22. A flash unit as defined in claim 21, wherein said operating means further comprises a holding switch connected between the base of said transistor and one pole of said source, and actuating means for closing said holding switch in response to the first working stroke of said armature.

23. A flash unit as defined in claim 22, wherein said indexing means further comprises a rotary output member connected with said support and said actuating means comprises a cam connected with said output member and arranged to close said holding switch while said rotary member turns through a predetermined angle.

24. A flash unit as defined in claim 23, wherein said rotary member is a ratchet wheel connected with said support and said indexing means further comprises a pawl connected with said armature and cooperating with said rachet wheel to rotate said support when said armature performs working strokes.

References Cited

UNITED STATES PATENTS

| | | | |
|---|---|---|---|
| 2,557,531 | 6/1951 | Blanchet | 240—37.1 XR |
| 3,263,068 | 7/1966 | Jakob | 240—1.3 |
| 3,312,086 | 4/1967 | Casebeer et al. | 240—1.3 XR |

FOREIGN PATENTS 1,470,976  1/1967  France.

NORTON ANSHER, Primary Examiner

F. L. BRAUN, Assistant Examiner

U.S. Cl. X.R.

240—1.3, 37.1